(12) United States Patent
Machida (10) Patent No.: US 6,561,323 B2
(45) Date of Patent: May 13, 2003

(54) ROTARY DAMPER

(75) Inventor: Kazunori Machida, Kanagawa (JP)

(73) Assignee: Piolax Inc., Yokohama (JP)

( * ) Notice: Subject to any disclaimer, the term of this patent is extended or adjusted under 35 U.S.C. 154(b) by 0 days.

(21) Appl. No.: 09/784,167

(22) Filed: Feb. 16, 2001

(65) Prior Publication Data

US 2001/0017247 A1 Aug. 30, 2001

(30) Foreign Application Priority Data

Feb. 18, 2000 (JP) ........................................ 2000-040504
Dec. 22, 2000 (JP) ........................................ 2000-389701

(51) Int. Cl.[7] ............................................ F16D 57/02
(52) U.S. Cl. ........................................ 188/293; 188/290
(58) Field of Search ................................ 188/290, 291, 188/293, 294

(56) References Cited

U.S. PATENT DOCUMENTS

| | | |
|---|---|---|
| 4,796,733 A | 1/1989 | Nakayama |
| 5,497,863 A | 3/1996 | Schmidt et al. |
| 6,041,899 A * | 3/2000 | Takamatsu |

FOREIGN PATENT DOCUMENTS

| | | |
|---|---|---|
| EP | 07-63671 A2 | 3/1997 |
| JP | 10-299809 | 11/1998 |
| JP | 11-190377 | 7/1999 |

* cited by examiner

*Primary Examiner*—Christopher P. Schwartz
(74) *Attorney, Agent, or Firm*—McGinn & Gibb, PLLC (57) ABSTRACT

A rotary damper includes a pair of rotary members which pivot via rotating support shafts includes an outer tube, an inner tube having a smaller diameter than that of the outer tube, an outer wall of the inner tube being fitted into a tubular space of the outer tube and the inner wall of the outer tube being fitted into the tubular space of the inner tube, a first O-ring installed in an end portion on the open side of a gap between the outer wall of the outer tube and the outer wall of the inner tube, a second O-ring installed in an end portion on the open side of the gap between the inner wall of the outer tube and the inner wall of the inner tube, a viscous substance with which the gaps between the inner tube and the outer tube sealed by the first and second O-rings are filled, a central hole of the inner tube serving as a through-hole for receiving the rotating support shafts, and a mating member, mating with the respective rotating members, being provided on the inner tube and the outer tube.

14 Claims, 6 Drawing Sheets

ROTARY DAMPER

BACKGROUND OF THE INVENTION

1. Field of the Invention

The present invention relates to a rotary damper that is fitted to a pair of rotary members relatively pivotally combined together respectively via rotating support shafts.

2. Description of the Related Art

Figure 6:
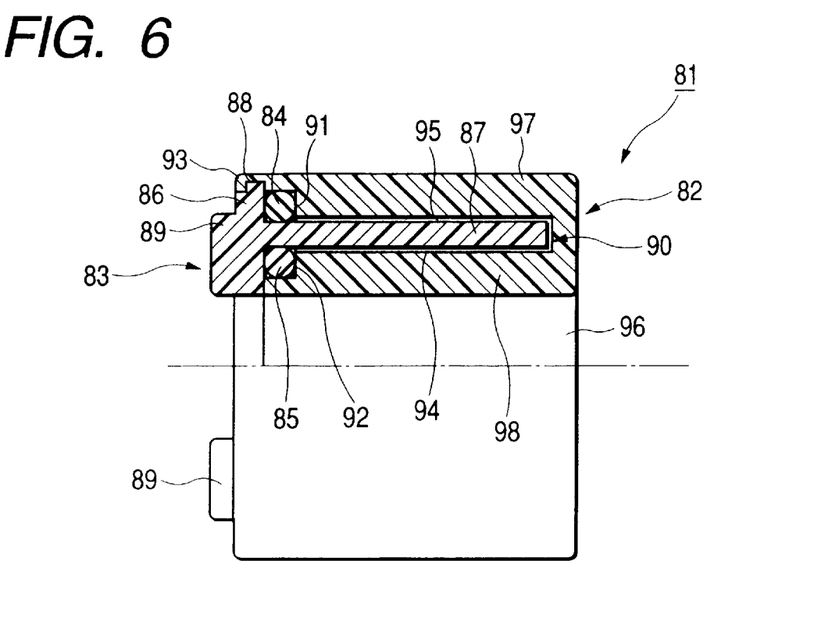
FIG. 6 is a partial vertical section of a conventional rotary damper.

FIG. 6 shows an example of a conventional rotary damper for uses mentioned above. The conventional rotary damper 81 has a rotor 83 with an insert tube 87 extending from one side of an annular cap 86, and a body case 82 formed with a tubular space 90 with one end blocked by a tubular wall. The cap 86 of the rotor 33 is formed with a mating projection 89 projecting from a side opposite to that one side with the insert tube 87, and a collar 88 projecting from the outer peripheral face. A first O-ring groove 91 is formed on the side of an outer wall 97 and a second O-ring groove 92 is formed in the open end portion of the tubular space of the body case 82. The outer wall 97 extends further along the axial direction from a the open end portion of the tubular space 90, and its end portion forms an annular tubular portion 93 mating with the collar 88 of the cap 86.

A first O-ring 84 is disposed in the first O-ring groove 91, whereas a second O-ring 92 is disposed in the second O-ring groove 85. The insert tube 87 of the rotor 83 is inserted into the tubular space 90 via a gap between these O-rings 84 and 85. Further, the tubular space 90 is filled with a viscous substance such as silicone oil. A first gap 94 formed between the insert tube 87 and the inner wall 98 and sealed up with the second O-ring 85 and a second gap 95 formed between the insert tube 87 and the outer wall 97 and sealed up are replete with the viscous substance.

The rotor 83 is stopped from slipping off by the annular tube 93 mating with the collar 88 in such a condition that the body case 82 and the rotor 83 are joined together. The first O-ring 84 is pressed to contact, and contained in, the first O-ring groove 84, whereas the second O-ring 85 is pressed to contact, and contained in, the second O-ring groove 92. The central hole of the cap 86 and that of the body case 82 are coupled together and used to form an integral insert hole 96.

Since the first and second gaps 94 and 95 in the conventional rotary damper 81 are replete with the viscous substance, resistance force is produced as the viscous substance is sheared when the body case 81 and the rotor 83 are relatively pivoted, so that the relative pivoting operations of the body case 82 and the rotor 83 are damped.

Consequently, by mixing the body case 82 to one of the pair of members combined together in such a manner capable of relatively pivoting, fixing the rotor 83 to the other member, and inserting these rotating support shafts into the insert hole 96, the damping force with respect to the pair of members becomes obtainable.

In the above conventional rotary damper, the resistance force of the viscous substance for damping the pivoting operations relies upon areas where the outer and inner walls 97 and 98 are brought into contact with the viscous substance in a case where the characteristics of the viscous substance are the same. In the rotary damper above, however, it has been needed to increase the size of the rotary damper in order to increase the damping force because the contact surfaces above are mainly provided in the respective first and second gaps 94 and 95.

Moreover, as the first and second O-rings 84 and 85 are situated in the same position in the axial direction, it is also needed to increase the outer diameter of the rotary damper 81 so as to secure the first and second O-ring grooves 91 and 92. At the same time, the O-ring grooves 91 and 92 tend to be dislocated from the respective corresponding O-ring grooves 91 and 92 when the insert tube 87 is inserted into the tubular space 90, thus causing the O-rings 84 and 85 to undergo a positional deviation. The problem is that such a positional deviation remains hardly visually confirmable.

SUMMARY OF THE INVENTION

An object of the present invention is to provide a rotary damper which is compact and still capable of offering a greater damping force and is also readily incorporated in any vehicle.

In order to accomplish the object above, a rotary damper according to a first invention which is fitted up with a pair of rotary members in combination so that the pair of rotary members can relatively pivot via a rotary support shaft, comprises:

an outer tube which has a tubular space inside the wall of the outer tube and is so configured that one end of the space is closed; and an inner tube basically similar in shape to the outer tube but smaller in diameter than the outer tube, wherein the outer wall of the inner tube is fitted into the tubular space of the outer tube;

the inner wall of the outer tube is fitted into the tubular space of the inner tube;

O-rings are respectively installed in an end portion on the open side of the gap between an inner portion of the outer wall of the outer tube and an outer portion of the outer wall of the inner tube, and in an end portion on the open side of the gap between an inner portion of the inner wall of the outer tube and an outer portion of the inner wall of the inner tube;

the gaps between the inner tube and the cuter tube sealed by these O-rings are filled with a viscous substance;

the central hole of the inner tube is a through-hole for receiving the rotating support shaft; and mating means mating with the respective rotating members are provided to the inner tube and the outer tube.

As the first invention is so configured that the tubular spaces are formed respectively in the inner and outer tubes; the outer wall of the inner tube is fitted into the tubular space of the outer tube; and the inner wall of the outer tube is fitted into the tubular space of the inner tube, the first gap is formed between the inner wall of the inner tube and the inner wall of the outer tube; the second gap, between the inner wall of the outer tube and the outer wall of the inner tube; and the third gap, between the outer wall of the inner tube and the outer wall of the outer tube. Consequently, the three-layer gap is formed between the inner and outer tubes and directed outward from the center along the diametrical direction. In comparison with the conventional rotary damper with the two-layer gap formed and directed outward from the center along the diametrical direction, a greater area in contact with the viscous substance filled in the gaps is achievable even though the prior art rotary damper and what embodies the invention are of a size. Therefore, it is possible to provide a rotary damper which is more compact and capable of offering a greater damping force than the conventional rotary damper.

The O-rings are respectively installed in the end portion on the open side of the gap between an inner portion of the outer wall of the outer tube and an outer portion of the outer wall of the inner tube, and in the end portion on the open side of the gap between an inner portion of the inner wall of the outer tube and an outer portion of the inner wall of the inner tube, whereby the O-rings are disposed in positions deviating from each other in the axial direction. Consequently, the diameter of the rotary damper according to the invention can be made smaller than the conventional rotary damper wherein such O-rings are disposed axially in the same position.

A second invention is such that the rotary damper according to the first invention includes an O-ring groove formed in the inner periphery on the open side of the gap between an inner portion of the inner wall of the outer tube and an inner portion of the inner wall of the inner tube, and an annular cap for closing the O-ring groove.

According to the second invention, a first O-ring is installed between the inner tube and the outer tube when the inner tube is inserted into the outer tube and after the inner tube is inserted into the outer tube, a second O-ring is inserted into the O-ring groove from the opposite end portion so as to close the O-ring groove with the cap. Thus, the assembling work is facilitated because the positions of both O-rings to be installed are easily confirmable and the O-rings are prevented from positional deviation and slipping out of place.

A third invention is such that in the rotary damper in the first or second invention, the outer tube is made immovable with respect to the rotary support shaft, and sliding resistance means is installed between the inner periphery of the central hole of the inner tube and the stating support shaft which is passed through the central hole thereof.

According to the third invention, as the sliding resistance in addition to the viscous substance filled in the rotary damper contributes to damping, a higher damping force is obtainable.

A fourth invention is such that in the rotary damper according to the second invention, fitting means is provided between the inner periphery of the cap and the outer periphery of the inner wall of the inner tube.

According to the fourth invention, the cap is securely fitted in the inner tube by the fitting means provided between the inner periphery of the cap and the outer periphery of the inner wall of the inner tube by inserting the second O-ring into the O-ring groove provided in the inner periphery on the open side of the gap between an inner portion of the inner wall of the outer tube and an outer portion of the inner wall of the inner tube. Consequently, even though the force of pulling the inner tube out of the outer tube works, the cap securely fitted in the inner tube prevents the inner tube from slipping off, whereby the incorporated condition of the rotary damper is sustained.

BRIEF DESCRIPTION OF THE DRAWINGS

FIGS. 3A and 3B are diagrams showing an inner tube of the rotary damper, in which

FIGS. 4A and 4B are diagrams showing an outer tube of the rotary damper, in which

DETAILED DESCRIPTION OF THE PREFERRED EMBODIMENTS

Now, a description will be given in more detail of preferred embodiments of the invention with reference to the accompanying drawings.

FIGS. 1 to 5 show a rotary damper embodying the present invention.

Figure 2:
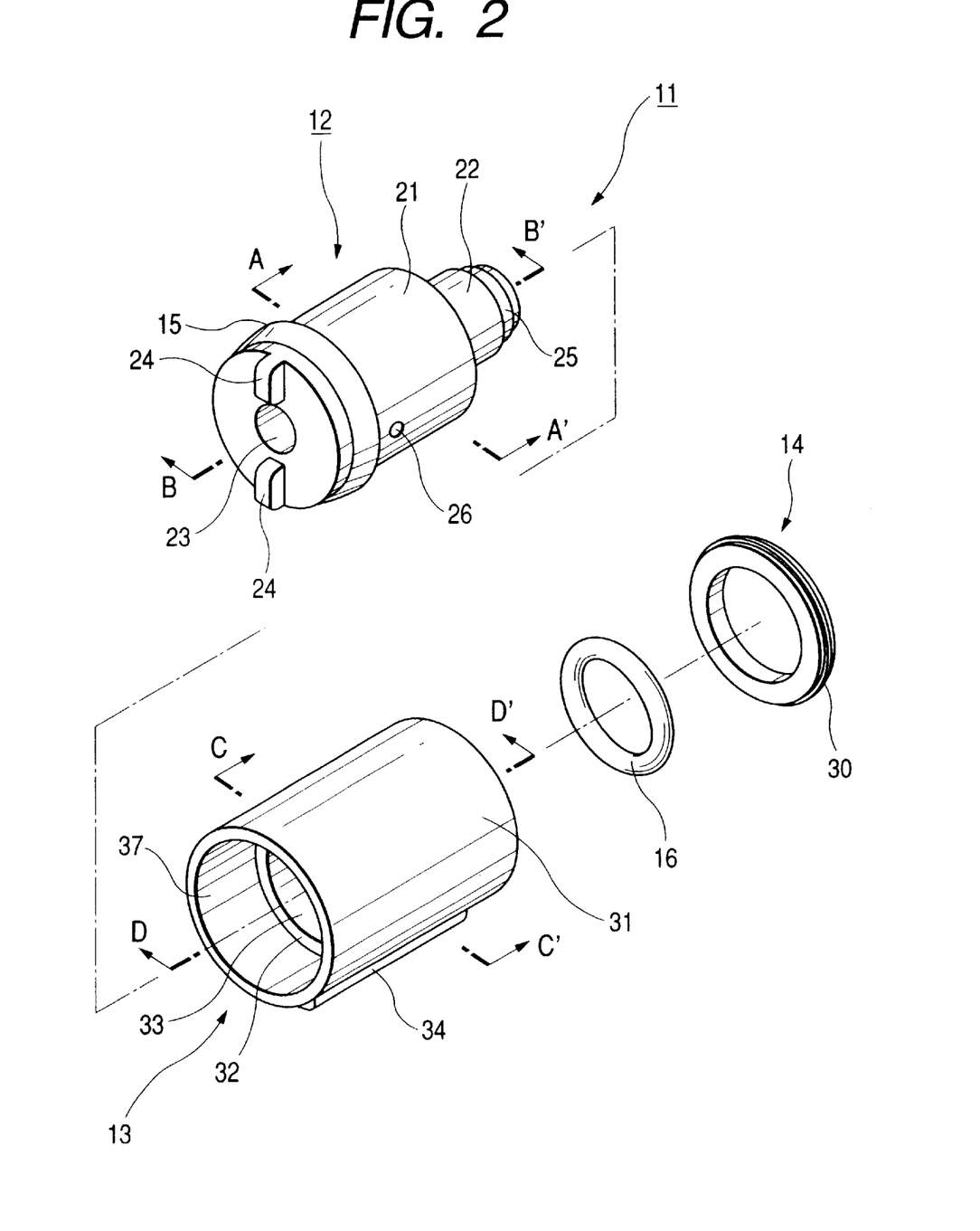
FIG. 2 is an exploded perspective view showing the rotary damper according to the invention.

As shown in FIG. 2, a rotary damper 11 includes an inner tube 12, an outer tube 13, a cap 14, a first O-ring 15, and a second O-ring 16.

Figure 3A:
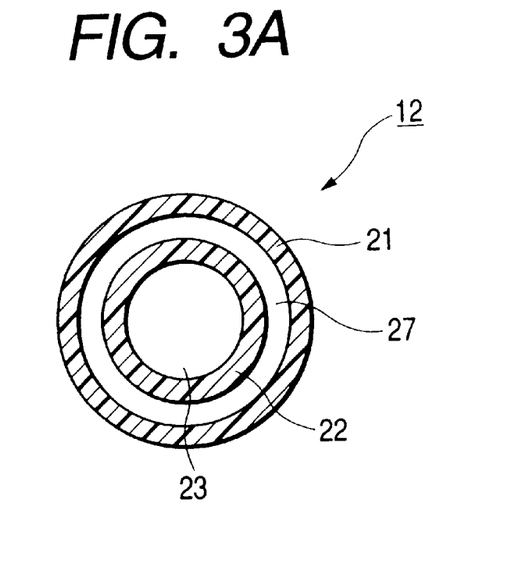
FIG. 3A is a sectional view taken along arrows A-A' of FIG. 2
Figure 3B:
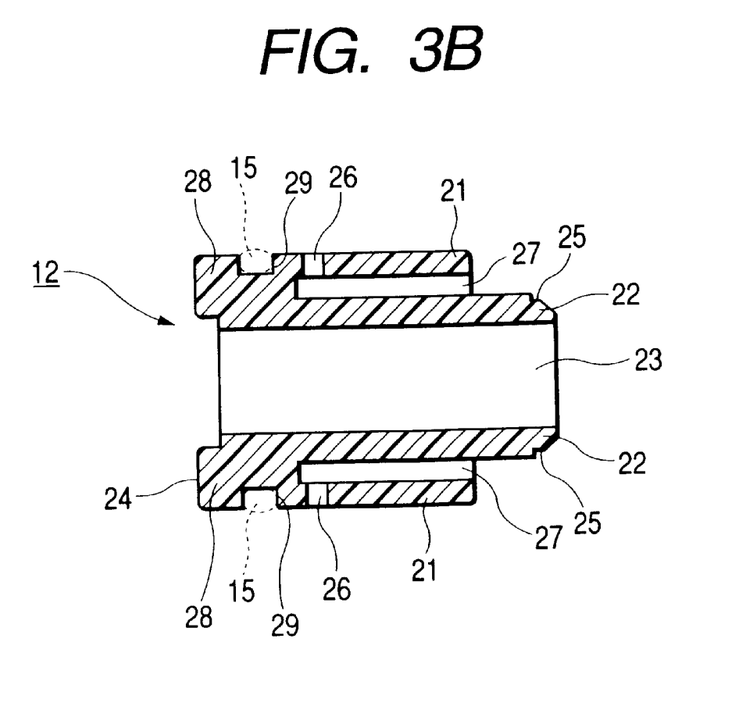
FIG. 3B is a sectional view taken along arrows B-B' of FIG. 2.

As shown in FIGS. 2 and 3, the inner tube 12 is generally in the form of a tubular body having a through-hole 23 in its center, and a tubular space 27 is formed in the wall of the tubular body, thus forming a double stricture having an outer and an inner wall 21 and 22. One end of the tubular space 27 is blocked by a closed portion 28 integrally formed with the outer and inner walls 21 and 22. On the open end side of the tubular space 27 of the inner tube 12 lies the inner wall 22 extending longer than the outer wall 21 in the axial direction, and a cap groove 25 is provided in the outer periphery of the front end portion of the inner wall 22. Moreover, an air vent hole 26 communicating with the tubular space 27 of the inner tube 12 is provided in the outer periphery of the outer wall 21 of the inner tube 12. An annular groove 29 for fitting the first O-ring 15 is formed in the predetermined position of the outer periphery of the closed portion 28. A rib-shaped mating projection 24 extending in the diametric direction is provided on the edge face of the closed portion 28.

Figure 4A:
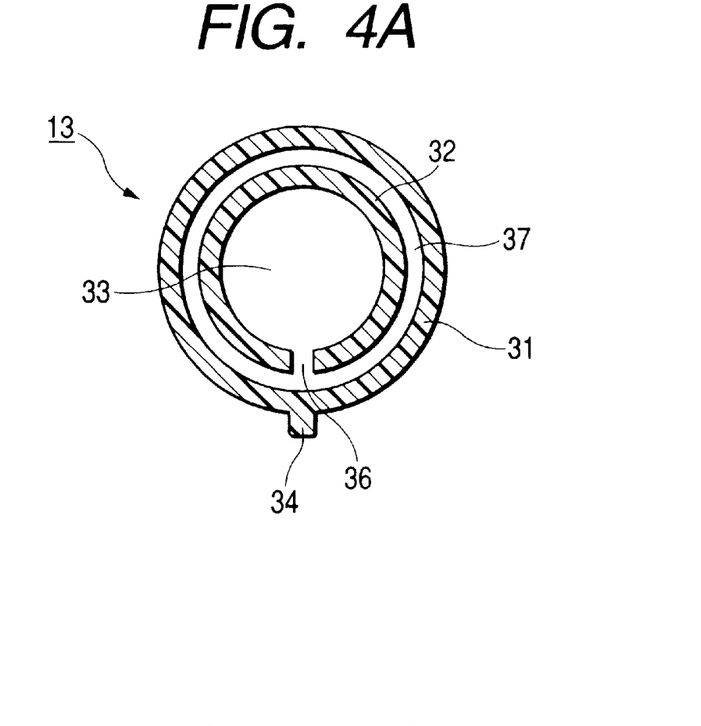
FIG. 4A is a sectional view taken along arrows C-C' of FIG. 2
Figure 4B:
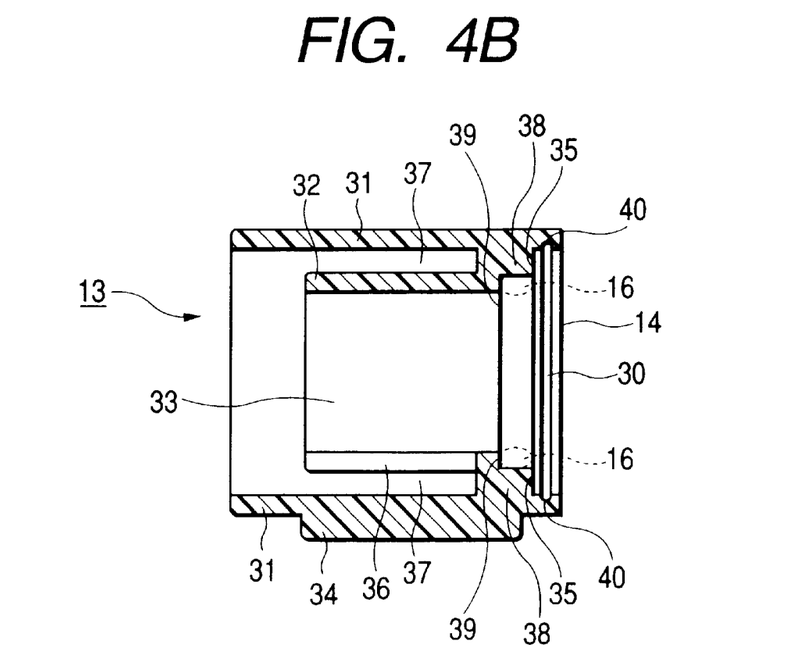
FIG. 4B is a sectional view taken along arrows D-D' of FIG. 2.

As shown in FIGS. 2 and 4, the outer tube 13 is generally in the form, of a tubular body having a through-hole 33 in its center, and a tubular space 37 is formed in the wall of the tubular body, thus forming a double structure having an outer and an inner wall 31 and 32. One end of the tubular space 31 of the outer tube 13 is blocked by a closed portion 38 integrally formed with the outer and inner walls 31 and 32. On the open end side of the tubular space 37 of the outer tube 13 of the outer wall of the outer tube lies the outer wall 31 of the outer tube 13 extending longer than the inner wall 32 in the axial direction. A slit 36 extending from the open end side of the tubular space 37 along the axial direction is formed in the predetermined peripheral position of the inner wall 32 of the outer tube 13. A rib-shaped mating projection 34 extending along the axial direction is formed in the predetermined position of the outer periphery of the outer wall 31 of the outer tube 13. A recessed cap groove 35 is formed in the edge face of a closed portion 38, and a recessed O-ring groove 39 is formed in the inner periphery of the cap groove 35. An annular groove 40 is also formed in the inner periphery of the cap groove 35.

The cap 14 is generally in an annular form and a collar 30 to be fitted in the annular groove 40 is formed on the outer periphery of the cap 14.

Although the quality of the materials of the inner tube 12, the outer tube 13 and the cap 14 is such that it is resistant to the viscous substance to be filled in, as will be described later, and readily formable, it is preferred to use polyacetal, for example, that is an oil resistant thermoplastics, when silicone oil is used as the viscous substance.

A procedure for incorporating the rotary damper 11 will now be described.

First, the first O-ring 15 is securely fitted in the annular groove 29 formed in the outer periphery of the closed portion 28 of the inner tube 12. Then the tubular space 37 of the outer tube 13 is filled with the viscous substance.

As any substance having viscosity fit for the condition in which the rotary damper 11 is employ may be selected as the viscous substance, silicone oil less variable in viscosity according to the temperature, for example is preferably used.

After the viscous substance is filled in, the inner tube 12 is inserted into the outer tube 13 so that the outer wall 21 of the inner tube 12 may be disposed in the tubular space 37 of the outer tube 13 and that the inner tube 12 of the outer tube 13 may be disposed in the tubular space 27. At this time, though the air pushed by the liquid level of the viscous substance rising toward the open end side from the closed end side of the tubular space 37 of the outer tube 13 flows into a third gap 43 formed between the outer wall 21 of the inner tube 12 and the outer wall 31 of the outer tube 13 and into a second gap 42 formed between the outer wall 21 of the inner tube 12 and the inner wall 32 of the outer tube 13, the air flowing into the second gap 42 is allowed to escape outside through the first gap 41 via the closed end of the tubular space 37 of the outer tube 13. Moreover, the air flowing into the third gap is also allowed to escape outside through the air vent hole 26 via the closed end of the tubular space 37 of the outer tube 13 through the first gap 41.

After the inner tube 12 is inserted into the outer tube 13, the second O-ring 16 is mounted on the outer periphery of the front end portion of the inner wall 22 of the inner tube 12 and forced in up to the position where it reaches the O-ring groove 39 of the outer tube 13. At this time, the front end portion of the inner wall 22 of the inner tube 12 is inserted into the central hole of the cap 14.

When the inner tube 12 is inserted into the outer tube 13, the first O-ring 15 securely fitted in the annular groove 29 of the inner tube 12 is mounted between the members and after the inner tube 12 is inserted into the outer tube 13, the second O-ring 16 can be mounted from the front edge face side of the inner tube 12 to ensure that the O-rings 15 and 16 are readily mounted, thus improving incorporating workability.

Figure 5:
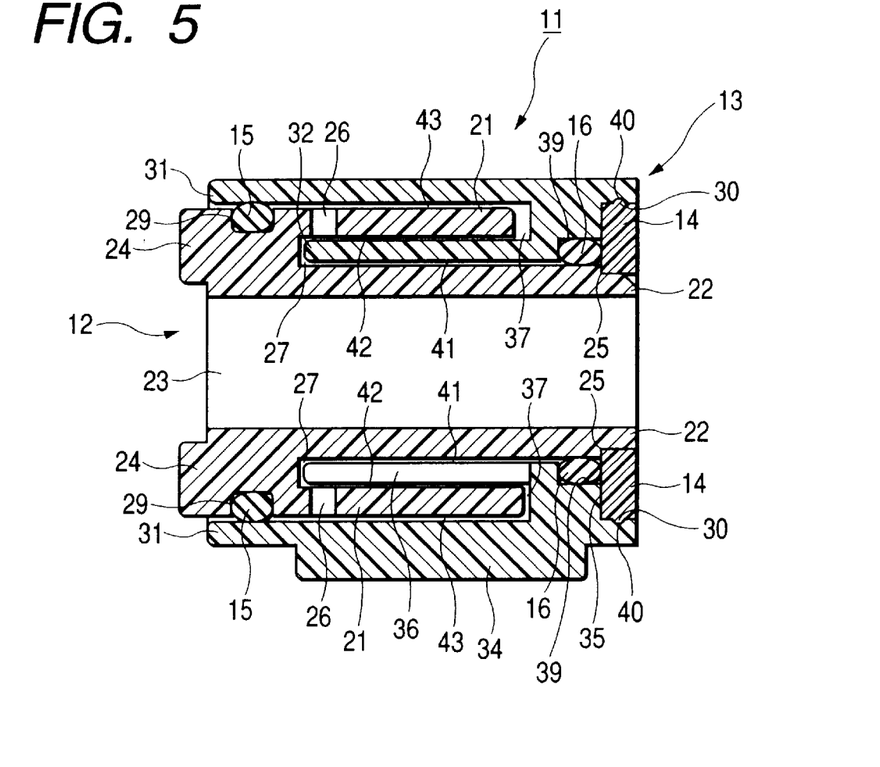
FIG. 5 is a vertical section view showing the rotary damper.

As shown in FIG. 5, the rotary damper 11 obtained in the aforementioned way has a threefold structure outside the radial direction from the axis, the structure comprising the first gap 41 between the inner wall 22 of the inner tube 12 and the inner wall 32 of the outer tube 32, the second gap 42 between the outer wall 21 of the inner tube 12 and the inner wall 32 of the outer tube 13, and the third gap 43 between the outer wall 21 of the inner tube 12 and the outer wall 31 of the outer tube 13.

Further, the open end of the first gap 41 is closed by the second O-ring 16; the open end of she third gap 43 is closed by the first O-ring 15; and a series of continuous gaps including the first, second and third gaps 41, 42 and 43 are replete with the viscous substance. Incidentally, the first and second gaps 41 and 42 communicate with each other on the closed end side of the tubular space 27 of the inner tube 12 and moreover the second and third gaps 42 and 43 communicate with each other on the closed end side of the tubular space 37 of the outer tube 13 also by the air vent hole 26 to secure the flow channel of the viscous substance whereby to make every corner of each of the gaps above replete with the viscous substance.

An assist grip 54 using the rotary damper 11 will now be described.

The assist grip 54 is pivotally fitted between a housing position where it is brought into contact with a side panel close to the ceiling of the upper portion of a door inside a vehicle and a raised usable position with respect to the panel. When the vehicle turns a curve, for example, a passenger of the vehicle is to raise and grip the assist grip 54 up to the usable position so as to use the assist grip 54 for sustaining one's own seating posture.

Figure 1:
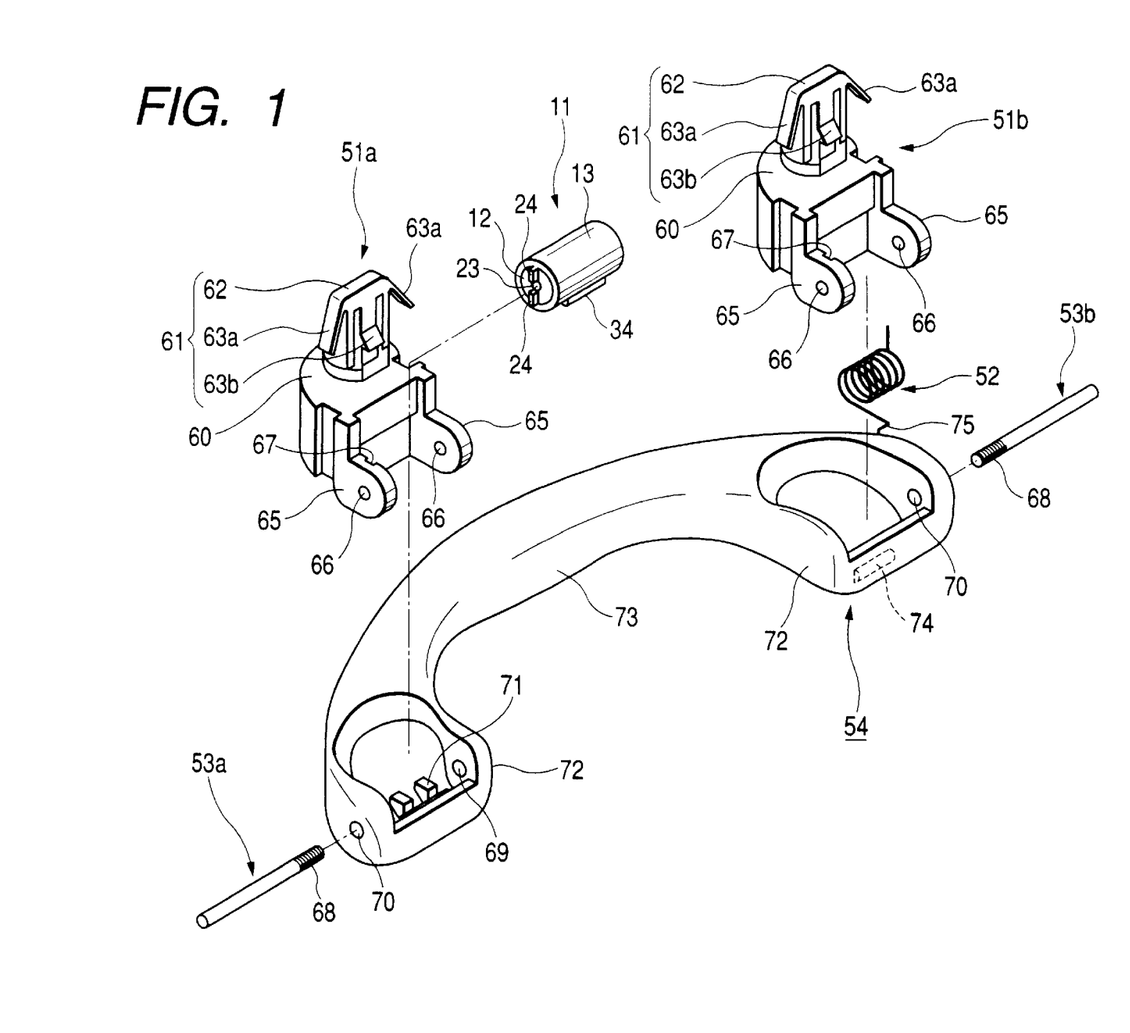
FIG. 1 is an exploded perspective view showing an assist grip to which a rotary damper according to the invention is applied.

As shown in FIG. 1, the assist grip 54 has a generally arcuate grin portion 73, and support members 51a and 51b. One end of each of the support members 51a and 51b is coupled to a receptacle 72 provided at both ends of the grip portion 73, the other end thereof being coupled to the side panel.

The receptacles 72 are recessed so as to house one ends of the respective support members 51a and 51b, and a support shaft insertion hole 70 is formed in one side wall surrounding each of the recessed portions. Moreover, a support-shaft receiving hole 69 into which a knurl portion 68 formed at the front end of each of the support shafts 53a and 53b is forced is formed inside each of the side walls opposite to the support shaft insertion hole 70.

A mating slit 71 mating with the mating projection 34 formed on the outer tube 13 of the rotary damper 11 is provided in the base of the one receptacle 72. Moreover, a spring bearing groove 74 is provided in a wall portion parallel to the support shaft 53b that is inserted into the support-shaft insertion hole 70 and the support-shaft receiving hole 60 of the other receptacle 72.

Each of the support members 51a and 51b has a body 60 so configured as to be housed in the receptacle 72, a setting portion 61 projected from the body 60 and inserted into the fitting hole of the vehicular panel (not shown) and a pair of support segments 65 projected from the body 60 and used for pivotally supporting the end portion of the grip portion 73.

The setting portion of each of the support members 51a and 51b has a shaft portion 62 extending from the body 60, a pair of first pawl parts 63a overhanging obliquely downward from both the respective sides of the front end portion of the shaft portion 62 and capable of bending inside, and a pair of second pawl parts 63b projecting outside from a 90 degrees shifted with respect to the first pawl parts 63a of the shaft portion 62 and also capable of bending inside.

Support-shaft insertion holes 66 passing through the thickness direction of the pair of support segments 65 of each of the support members 51a and 51b are respectively formed in those support segments 65. In the support members 51a wherein the rotary damper 11 is disposed, a mating slit 67 mating with the mating projection 24 of the inner tube 12 of the rotary damper 11 is provided in one inner face of the support segment 65.

The rotary damper 11 is fitted to the support member 51a housed in the one receptacle 72 of the grip portion 73. At this time, the rotary damper 11 is disposed between the pair of support segments 65 projected from the support member 51a and the mating projection 24 of the inner tube 12 is fitted in the mating slit 67 formed in the inner face of the one support segment 65, so that the turning of the rotary damper 11 is stopped with respect to the support member 51a. The mating projection 34 of the outer tube 13 is also fitted in the mating slit 71, so that the turning of the rotary damper 11 is stopped with respect to the grin portion 73.

The support shaft 53a is inserted into the support-shaft insertion hole 70 of the receptacle 72, the support-shaft insertion hole 66 of the one support segment 65, the through-hole 23 of the rotary damper 11, and the support-shaft insertion hole 66 of the other support segment 65. Then the knurl portion 80 at the front end of the support shaft 53a is forced into the support-shaft receiving portion 69 of the receptacle 72, whereby the grip portion 73 is pivotally coupled to the support member 51a via the support shaft 53a.

In the support member 51b housed in the other receptacle 72, the support shaft 53b is inserted into the support-shaft insertion hole 70 of the receptacle 72, the support-shaft insertion hole 66 of the one support segment 65, the center of a torsion coil spring 52, and the support-shaft insertion hole 66 of the other support segment 65. Then the knurl portion 68 at the front end of the support shaft 53b is forced into the support-shaft receiving portion 69 of the receptacle 72, whereby the grip portion 73 is pivotally coupled to the support member 51b via the support shaft 53b.

In this case, one end of the torsion coil spring 51 is bent in the form of a key and a fixed end 75 is formed in parallel to the central axis of the coil. The fixed end 75 is securely fitted in the spring receiving groove 74 provided in the wall portion parallel to the support shaft 53b of the receptacle 72. On the other hand, the other end of the torsion coil spring 52 is disposed so teat it is pressed to contact the wall surface of the body 60 between the support segments 65 of the support member 51. Moreover, the torsion coil spring 52 is always urging the grip portion 73 in such a manner as to pivot the grip portion 73 toward a panel to be fitted.

Although it is unnecessary to provide the mating slit 67 to the support member 51b fitted with the torsion coil spring 52 in FIG. 1, the mating slit 67 is still provided so that coon parts may be usable between the support members 51a and 51b to which the rotary damper 11 is fitted.

The grip portion 73 fitted with the support members 51a and 51b are fitted to the side panel by inserting the setting portions 61 of the support members 51a and 51b into the respective fitting holes provided in the side panel inside the vehicle. When the setting portions 61 are inserted into the respective fitting holes then, the first and second pawl parts 63a and 63b are thus inserted while being bent by the inner peripheries of the fitting holes. When the inserting operations are completed, the pawl part 63b is restored to the original shape and mated with the back surface of the inner periphery of the fitting hole before being fixed.

The functions of the assist grip 54 and the rotary damper 11 applied thereto will now be described.

The assist grip 54 is always urged by the action or the torsion coil spring 52 in such a manner that the grip portion 73 is brought into contact with the side panel inside the vehicle. When the vehicle body is jolted, the passenger raises and grips the grip portion 73 against the torsion coil spring 52 while grasping it to sustaining one's own seating posture.

In a case where the assist grip 54 is not needed any longer, the grip portion 73 is released, the grip portion 73 is pivoted by the urging force of the torsion coil spring 52 and brought into contact with the side panel. Thus, the grip portion 73 is prevented from becoming an impediment by protruding within the vehicle.

When the grip portion 73 is released in this case, as the grip portion 73 is brought into contact with the side panel while being slowing pivoted by the action of the rotary damper 11, any impact sound and the like are also prevented from being produced.

In other words, the mating projection 34 of the outer tube 13 or the rotary damper 11 is fitted in the mating slit 71 formed in the receptacle 72 and the turning of the outer tube 13 is stopped with respect to the grip portion 73. The mating projection 24 of the inner tube 12 of the rotary damper 11 is fitted in the mating slit 67 of the support member 51a and the turning of the inner tube 12 is stopped with respect to the support member 51a. Therefore, the outer tube 13 and the inner tube of the rotary damper 11 are relatively pivoted when the grip portion 73 is pivoted with respect to the support member 51a.

In a case where the outer tube 13 and the inner tube 12 thus pivot relatively, the viscous substance filled in the first, second and third gaps 41, 42 and 43 formed from the axis toward the external radial direction is subjected to shearing force by the contact surface between the outer tube 13 and the inner tube 12, and the damper action is obtainable because rotational resistance is generated. In this case, since the three-layer contact surface is formed from the axis toward the external radial direction as stated above, it is possible to secure a wider area in contact with viscous-substance and also to obtain a strong damper action even though the rotary damper 11 is compact in shape.

Incidentally, a sliding resistance means such as an elastomer layer may be provided between the inner periphery of the through-hole 23 of the rotary damper 11 and the outer periphery of the rotary support shaft 53a. In this case, as the sliding resistance in addition to the rotational resistance by the viscous substance contributes to damping, a higher damping force is obtainable.

The use of the rotary damper according to the invention is not limited to the assist grip but may be applicable to various rotary members that require the damping of pivotal motion such as center consoles of vehicles.

Figure 7:
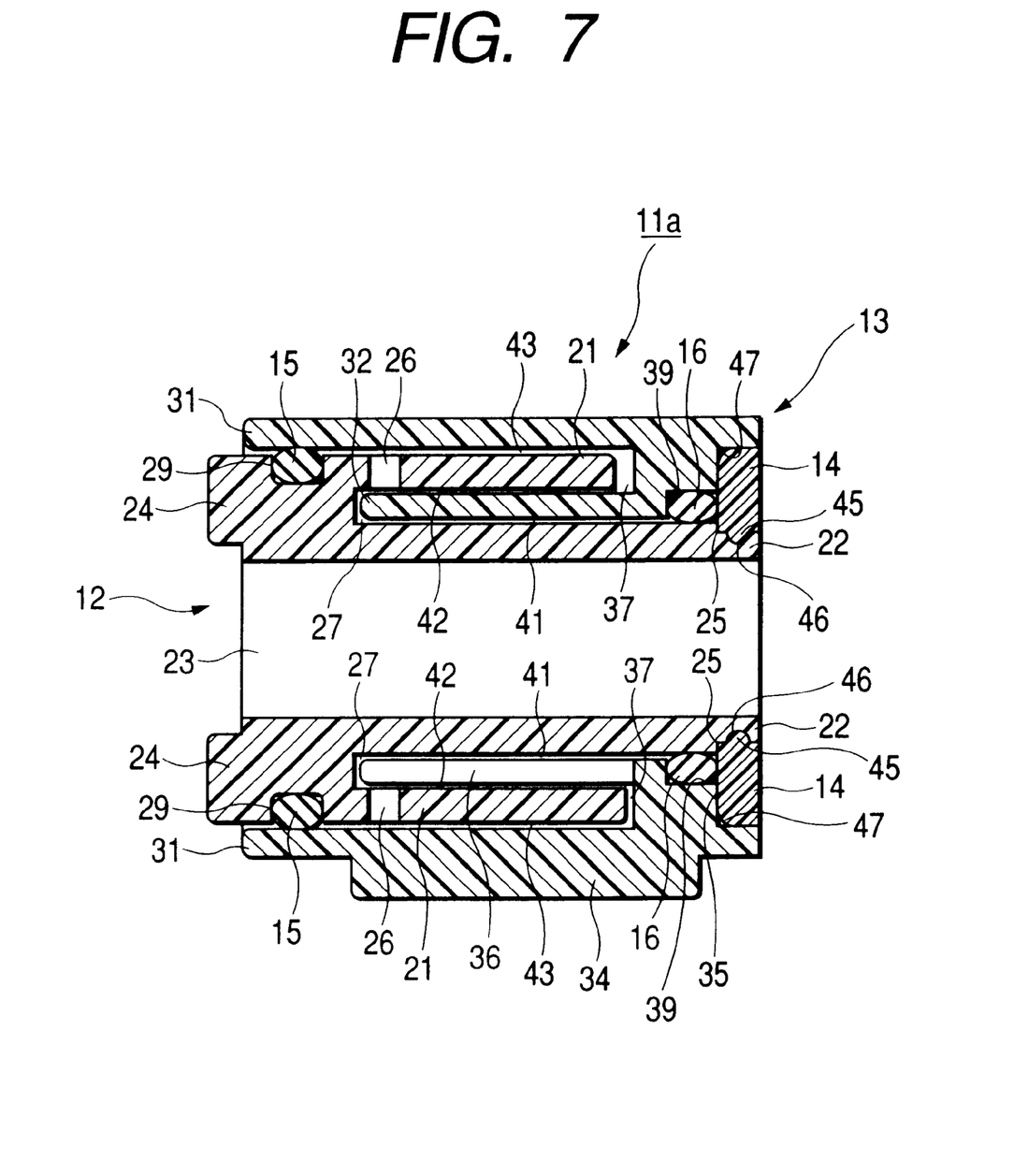
FIG. 7 is a sectional view showing another rotary damper embodying the invention.

FIG. 7 shows another rotary damper embodying the invention.

This rotary damper 11a is basically similar in structure to what is shown in FIGS. 1–5 but different in the fitting structure of the cap 14. More specifically, an annular projection 45 is formed on the inner periphery of the cap 14, and an annular groove 46 is also formed in the cuter periphery of the front end portion to the inner wall of the inner tube 12. The annular projection 45 and the annular groove 46 constitute a fitting means according to the invention. Moreover, a corner portion 47 positioned in the front insertion direction of the outer periphery of cap 14 is chamfered in the form of R.

In a case where the cap 14 is inserted into the cap groove 35 after the second O-ring 16 is inserted into the O-ring groove 39, the annular projection 45 of the cap 14 is fitted in the annular groove 46 of the inner wall 22 of inner tube 12, and the cap 14 is fixed to the inner tube 12. Consequently, as the cap 14 is mated with the outer tube 13, the inner tube 12 is never carelessly pulled out even though it is attempted to pull the inner tube 12 out of the outer tube 13 to ensure that the inner tube 12 is incorporated with the outer tube 13.

With the chamfered corner portion 47 of the outer periphery or the cap 14, the cap 14 becomes easily insertable when cap 14 is inserted into the cap groove 35. In this case, the corner portion 47 may be not only chamfered in the form of R but also tapered.

However, the annular groove is provided in the inner periphery to the cap 14, and the annular projection is also provided on the outer periphery of the front end portion of the inner wall 22 of the inner tube 12 whereby to fit the protection in the groove.

As set forth above, the invention is so configured that: the tubular spaces are formed respectively in the inner and outer tubes; the outer wall of the inner tube is fitted into the tubular space of the outer tube; and the inner wall of the outer tube is fitted into the tubular space of the inner tube. Consequently, the three-layer gap is formed between the inner and outer tubes and directed outward from the center along the diametrical direction. Therefore, a greater area in contact with the viscous substance filled in the gaps can be secured and this makes it possible to obtain a rotary damper which is compact and capable of offering a great damping force.

The O-rings are respectively installed in the end portion on the open side of the gap between an inner portion of the outer wall of the outer tube and an outer portion of the outer wall of the inner tube, and in the end portion on the open side of the gap between an inner portion of the inner wall of the outer tube and an outer portion of the inner wall of the inner tube, whereby the O-rings are disposed in positions deviating from each other in the axial direction. Consequently, the diameter of the rotary damper can be made smaller.

What is claimed is:

1. A rotary damper including a pair of rotary members which relatively pivot via a rotary support shaft, said rotary damper comprising:

an outer tube which has a tubular space inside a wall of said outer tube and is configured such that one end of said space is closed;

an inner tube having a smaller diameter than that of said outer tube, an outer wall of said inner tube being fitted into the tubular space of said outer tube, and the inner wall of said outer tube being fitted into the tubular space of said inner tube;

a first O-ring installed in an end portion on the open side of a gap between an inner portion of the outer wall of said outer tube and an outer portion of the outer wall of said inner tube;

a second O-ring installed in an end portion on the open side of the gap between an inner portion of the inner wall of said outer tube and an outer portion of the inner wall of said inner tube;

a viscous substance with which the gaps between said inner tube and said outer tube sealed by said first and second O-rings are filled, a central hole of said inner tube serving as a through-hole for receiving said a rotary support shaft; and a mating member, mating with the respective rotating members, being provided on said inner tube and said outer tube.

2. The rotary damper as claimed in claim 1, wherein a groove for the second O-ring is formed in the inner periphery on the open side of the gap between the inner wall of said outer tube and the inner wall of said inner tube, and an annular cap for closing said second O-ring groove.

3. The rotary damper as claimed in claim 2, wherein said outer tube is made immovable with respect to the rotary support shaft, said rotary damper further comprising a sliding resistance member installed between the inner periphery of the central hole of said inner tube and the rotary support shaft passed through the central hole thereof.

4. The rotary damper as claimed in claim 2, further comprising a fitting member provided between the inner periphery of said cap and the outer periphery of the inner wall of said inner tube.

5. The rotary damper as claimed in claim 1, wherein said outer tube is made immovable with respect to the rotary support shaft, said rotary damper further comprising a sliding resistance member installed between the inner periphery of the central hole of said inner tube and the rotary support shaft passed through the central hole thereof.

6. A rotary damper including a pair of rotary members which relatively pivot via a rotary support shaft, said rotary damper comprising:

an outer tube including a tubular space inside a wall of said outer tube and is configured such that one end of said tubular space is closed;

an inner tube having a smaller diameter than that of said outer tube, an outer wall of said inner tube being fitted into the tubular space of said outer tube, and the inner wall of said outer tube being fitted into the tubular space of said inner tube;

a first O-ring installed in an end portion on the open side of a gap between an inner portion of the outer wall of said outer tube and an outer portion of the outer wall of said inner tube; and a second O-ring installed in an end portion on the open side of the gap between an inner portion of the inner wall of said outer tube and an outer portion of the inner wall of said inner tube.

7. The rotary damper as claimed in claim 6, wherein a central hole is formed in said inner tube for receiving said rotary support shaft.

8. The rotary damper as claimed in claim 7, further comprising:

a sliding resistance member installed between the inner periphery of the central hole of said inner tube and the rotary support shaft passed through the central hole thereof.

9. The rotary damper as claimed in claim 6, further comprising:

a groove for the second O-ring formed in the inner periphery on the open side of the gap between the inner wall of said outer tube and the inner wall of said inner tube.

10. The rotary damper as claimed in claim 9, wherein an annular cap seals said second O-ring groove.

11. The rotary damper as claimed in claim 10, further comprising:

a fitting member provided between the inner periphery of said cap and the outer periphery of the inner wall of said inner tube.

12. The rotary damper as claimed in claim 6, wherein the gaps between said inner tube and said outer tube sealed by said first and second O-rings are filled with a viscous substance.

13. The rotary damper as claimed in claim 6, further comprising:

a mating member mating with the respective rotary members, being provided on said inner tube and said outer tube.

14. The rotary damper as claimed in claim 6, wherein said outer tube is immovable with respect to the rotary support shaft.

* * * * *